United States Patent
Stroh et al.

(10) Patent No.: US 7,926,263 B2
(45) Date of Patent: Apr. 19, 2011

(54) REGENERATION SYSTEM AND METHOD FOR EXHAUST AFTERTREATMENT DEVICES

(75) Inventors: David J. Stroh, Columbus, IN (US); Michael B. Viola, Macomb Township, MI (US); Charles E. Solbrig, Ypsilanti, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 174 days.

(21) Appl. No.: 11/960,833

(22) Filed: Dec. 20, 2007

(65) Prior Publication Data

US 2009/0158715 A1   Jun. 25, 2009

(51) Int. Cl.
*F01N 3/00*   (2006.01)

(52) U.S. Cl. ............... 60/295; 60/274; 60/276; 60/297; 60/301; 60/311

(58) Field of Classification Search .............. 60/286, 60/295, 297, 301, 274, 276, 311
See application file for complete search history.

(56) References Cited

U.S. PATENT DOCUMENTS

| | | | |
|---|---|---|---|
| 6,832,473 B2 * | 12/2004 | Kupe et al. | 60/286 |
| 6,915,629 B2 * | 7/2005 | Szymkowicz | 60/289 |
| 7,155,331 B1 * | 12/2006 | Zhang et al. | 701/108 |
| 7,155,334 B1 * | 12/2006 | Stewart et al. | 701/114 |
| 7,509,801 B2 * | 3/2009 | Asanuma | 60/295 |
| 2004/0040292 A1 * | 3/2004 | Odendall | 60/297 |
| 2005/0103001 A1 * | 5/2005 | Kupe et al. | 60/286 |
| 2006/0153761 A1 * | 7/2006 | Bandl-Konrad et al. | 423/239.1 |
| 2007/0089405 A1 * | 4/2007 | Asanuma | 60/295 |
| 2007/0137181 A1 | 6/2007 | Upadhyay et al. | |
| 2008/0163610 A1 * | 7/2008 | Baird et al. | 60/295 |
| 2008/0271440 A1 * | 11/2008 | Xu et al. | 60/295 |

FOREIGN PATENT DOCUMENTS

| | | |
|---|---|---|
| EP | 1421987 A2 | 5/2004 |
| JP | 2005351171 A | 12/2005 |

* cited by examiner

*Primary Examiner* — Thomas E Denion
*Assistant Examiner* — Diem Tran

(57) ABSTRACT

A method and system is disclosed for regenerating a particulate filter, desulfating a lean NOx trap, desulfating or regenerating a hydrocarbon-selective catalytic reduction catalyst, desulfating or regenerating a urea-selective catalytic reduction catalyst, or a combination thereof.

23 Claims, 1 Drawing Sheet

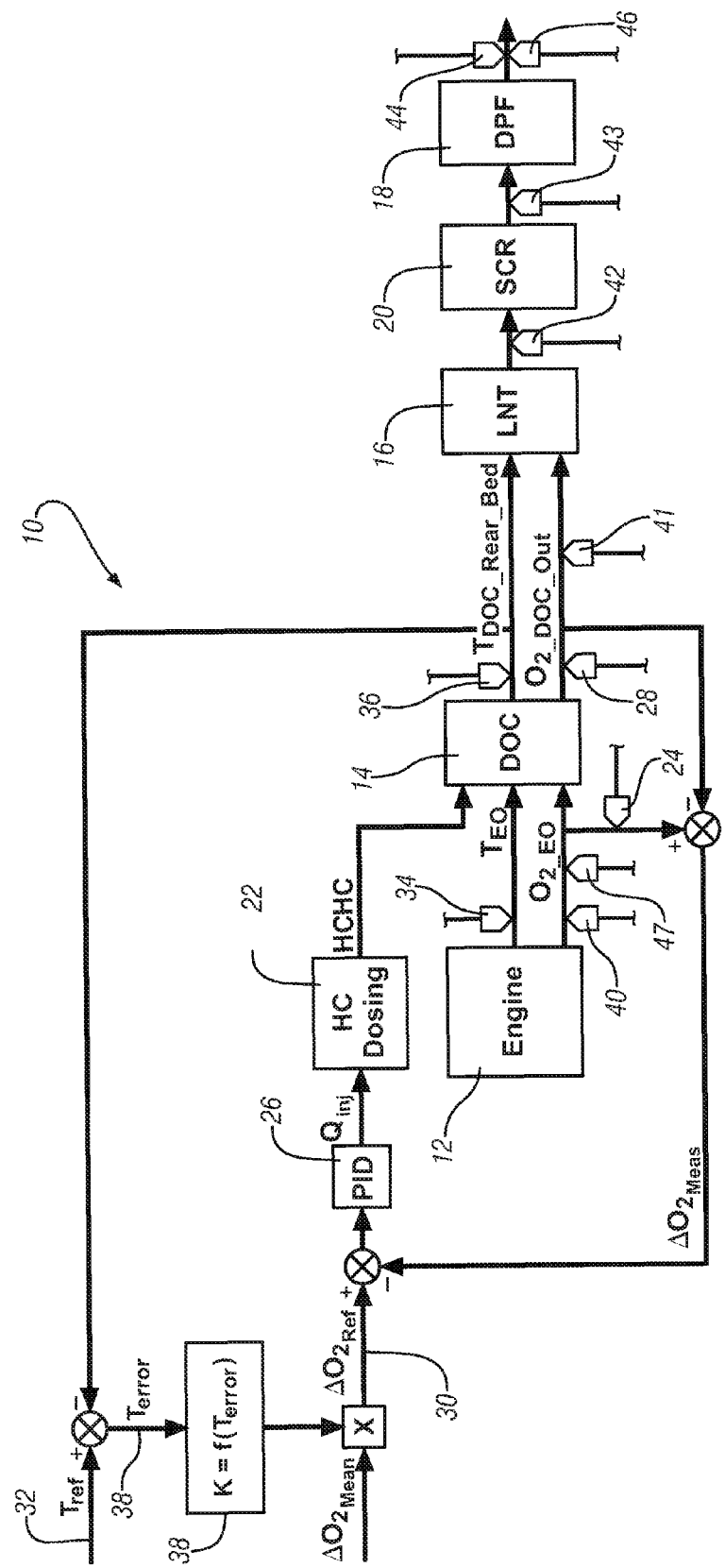

REGENERATION SYSTEM AND METHOD FOR EXHAUST AFTERTREATMENT DEVICES

TECHNICAL FIELD

This disclosure is related to exhaust aftertreatment for an internal combustion engine.

BACKGROUND

Exhaust gas aftertreatment systems and methods are known for, alone or in combination, regenerating one or more exhaust aftertreatment devices, including regenerating a particulate filter, for example a diesel particulate filter, desulfating a lean NOx trap, and desulfating or regenerating a catalyst, in embodiments a selective catalytic reduction catalyst (SCR catalyst) or a urea-selective catalytic reduction catalyst, located downstream of an internal combustion engine, in embodiments, a gasoline engine or a diesel engine.

Diesel engines are operated at higher than stoichiometric air to fuel mass ratios for improved fuel economy. Such lean-burning engines produce a hot exhaust with a relatively high content of oxygen and nitrogen oxides (NOx). The temperature of the exhaust from a warmed up diesel engine is typically in the range of about 200° C. to about 400° C. and has a representative composition, by volume, of about 10% to about 17% oxygen, about 3% carbon dioxide, about 0.1% carbon monoxide, about 180 parts per million (ppm) hydrocarbons, about 235 ppm NOx and the balance nitrogen and water.

NOx gases, typically comprising nitric oxide (NO) and nitrogen dioxide (NO2), are difficult to reduce to nitrogen (N2) because of the high oxygen (O2) content in the hot exhaust stream. Existing NOx reduction technologies, such as lean NOx trap technology and urea/selective catalytic reduction (SCR) technology, can provide some suitable NOx reduction performance under certain conditions.

Particulate filters, for example diesel particulate filters or gasoline particulate filters, trap soot in the exhaust and need to be regenerated periodically. Regeneration of the diesel particulate filter comprises elevating the temperature of the filter to a temperature sufficient to burn off the soot, typically from about 600° C. to about 700° C., and maintaining that temperature during the cleaning cycle.

A lean NOx trap stores NOx emissions during fuel lean operations and converts the stored NOx, during fuel rich conditions, to nitrogen and water. The lean NOx trap has limited storage capacity and must be regenerated with a fuel rich reducing "pulse" as it nears capacity. It is desirable to control the efficiency of the regeneration event of the lean NOx trap to provide optimum emission control and minimum fuel consumption.

Sulfur in the exhaust gas stream stored on the lean NOx catalyst has a detrimental effect on the lean NOx catalyst ability to reduce NOx emissions. Therefore, the lean NOx trap must be desulfated periodically. Sulfur is removed by providing a rich reducing "pulse" air fuel ratio while elevating the temperature of the lean NOx trap to a temperature of from about 700° C. to about 800° C.

The elevated temperatures are typically achieved through the use of an oxidation catalyst or in the case of a diesel engine a diesel oxidation catalyst (DOC), which generates an exothermal reaction with raw hydrocarbons that are injected into the exhaust stream, such as by in-cylinder injection or external injection directly into the exhaust stream. Temperature control of the oxidation catalyst can be problematic due to the large thermal mass associated with the catalyst as well as the transport delays between the point of injection and the temperature sensor location. Methods that have been used for controlling the temperature include use of open loop tables based on engine operating parameters and closed loop temperature control using temperature sensors at various locations in the exhaust stream. Closed loop temperature control of the oxidation catalyst using temperature sensors can be limited by the slow response of the system. Engine out particulate matter maps, models or particulate matter sensors can also be used.

SUMMARY

Embodiments disclosed herein include a method and system for regenerating a particulate filter, desulfating a lean NOx trap, desulfating or regenerating a reduction catalyst, or a combination thereof. An oxidation catalyst is downstream of an internal combustion engine and upstream of the particulate filter, lean NOx trap, and reduction catalyst. A first oxygen sensor is upstream of the oxidation catalyst. A second oxygen sensor is downstream of the oxidation catalyst. A processor selects and maintains a desired change in oxygen concentration across the oxidation catalyst for a selected period of time to provide an exhaust stream exiting the oxidation catalyst having a desired temperature. An optional temperature sensor may provide an additional control loop. The particulate filter is regenerated by passing the exhaust stream exiting the oxidation catalyst through the particulate filter, wherein the temperature of the exhaust stream passing through the particulate filter and the selected period of time are sufficient to regenerate the particulate filter. The lean NOx trap is desulfated by passing the exhaust stream exiting the oxidation catalyst through the lean NOx trap, wherein the temperature of the exhaust stream passing through the lean NOx trap and the selected period of time are sufficient to desulfate the lean NOx trap. And, the reduction catalyst is desulfated or regenerated by passing the exhaust stream exiting the oxidation catalyst through the reduction catalyst, wherein the temperature of the exhaust stream passing through the reduction catalyst and the selected period of time are sufficient to desulfate or regenerate the reduction catalyst.

BRIEF DESCRIPTION OF THE DRAWINGS

One or more embodiments will now be described, by way of example, with reference to the accompanying drawing, in which a practice of the regeneration system and method in accordance with the present disclosure is illustrated schematically in the sole figure.

DETAILED DESCRIPTION

Referring now to the drawing, wherein the showings are for the purpose of illustrating certain exemplary embodiments only and not for the purpose of limiting the same, the figure illustrates a method for regenerating a particulate filter, for example a diesel particulate filter or a gasoline particulate filter, desulfating a lean NOx trap, desulfating or regenerating a reduction catalyst, including for example, a hydrocarbon-selective reduction catalyst, a urea selective reduction catalyst, or a combination of regenerating and desulfating a combination of such exhaust aftertreatment devices, comprising providing an oxidation catalyst downstream of an internal combustion engine and upstream of the particulate filter and lean NOx trap; providing a first oxygen sensor upstream of the oxidation catalyst; providing a second oxygen sensor downstream of the oxidation catalyst; providing a processor for selecting and maintaining a desired change in oxygen concentration across the oxidation catalyst for a selected period of time to provide an exhaust stream exiting the oxidation catalyst having a desired temperature; regenerating the particulate filter by passing the exhaust stream exiting the oxidation catalyst through the particulate filter, wherein the temperature of the exhaust stream passing through the particulate filter and the selected period of time are sufficient to regenerate the particulate filter; desulfating the lean NOx trap by passing the exhaust stream exiting the oxidation catalyst through the lean NOx trap for a selected period of time, wherein the temperature of the exhaust stream passing through the lean NOx trap and the selected period of time are sufficient to desulfate the lean NOx trap; and desulfating the reduction catalyst by passing the exhaust stream exiting the oxidation catalyst through the reduction catalyst for a selected period of time, wherein the temperature of the exhaust stream passing through the reduction catalyst and the selected period of time are sufficient to desulfate the reduction catalyst.

Further disclosed is a system for regenerating a particulate filter, desulfating a lean NOx trap, desulfating or regenerating a reduction catalyst, or a combination thereof, comprising an oxidation catalyst disposed downstream of an internal combustion engine; a particulate filter disposed downstream of the oxidation catalyst; a lean NOx trap disposed upstream or downstream of the particulate filter; a first oxygen sensor disposed upstream of the oxidation catalyst; a second oxygen sensor disposed downstream of the oxidation catalyst; and a processor for selecting and maintaining a desired change in oxygen concentration across the oxidation catalyst for a selected period of time to provide an exhaust stream exiting the oxidation catalyst having a desired temperature; wherein the selected period of time and desired temperature are sufficient to regenerate the particulate filter by passing the exhaust stream exiting the oxidation catalyst through the particulate filter; wherein the selected period of time and desired temperature are sufficient to desulfate the lean NOx trap by passing the exhaust stream exiting the oxidation catalyst through the lean NOx trap; and wherein the selected period of time and desired temperature are sufficient to desulfate or regenerate the reduction catalyst by passing the exhaust stream exiting the oxidation catalyst through the reduction catalyst.

The system and method herein provide, in various embodiments, improved temperature control for lean NOx trap desulfation, and, in further embodiments, selective catalytic reduction catalyst desulfation by controlling the oxygen delta across the diesel oxidation catalyst to achieve and maintain optimum desulfation catalyst temperatures during a regeneration event. While at the optimum catalyst temperature, typically from about 700° C. to about 800° C., the air/fuel ratio in the exhaust are cycled rich to lean to drive off sulfur from the catalyst which inhibits NOx efficiency. The time period for a desulfation can be determined as a function of the catalyst volume. For example, the maximum acceptable amount of sulfur loading, for example on a gram per Liter (g/L) of catalyst, can be determined and the desulfation time period can be selected as the amount of time it takes to desulfate the maximum acceptable sulfur loading.

The air/fuel ratio can be controlled by any suitable method, including in embodiments, operating the engine rich using premixed charged compression ignition (PCCI), exhaust HC injection, or post injection.

Regeneration of the diesel particulate filter can comprise elevating the temperature of the filter to a temperature sufficient to burn off the soot, typically from about 600° C. to about 700° C., and maintaining that temperature during the cleaning cycle. In embodiments herein, improved temperature control for diesel particulate filter regeneration is provided by controlling the oxygen delta across the diesel oxidation catalyst. The time period sufficient to regenerate the DPF varies, and is dependent on the catalyst volume and the soot loading. For example, the maximum acceptable amount of soot loading, for example on a gram per Liter (g/L) of DPF, can be determined and the regeneration time period can be selected as the amount of time it takes to regenerate the DPF when it reaches this maximum acceptable soot loading.

Referring to the FIGURE, a diagram of an exhaust aftertreatment system 10 is shown. Engine 12 is shown upstream of an oxidation catalyst 14, in embodiments, a diesel oxidation catalyst (DOC), which is disposed upstream of a plurality of exhaust treatment devices including a lean NOx trap 16, a particulate filter 18, in embodiments a diesel particulate filter (DPF) or a gasoline particulate filter, and a selective catalytic reduction (SCR) catalyst 20. The reduction catalyst can comprise other suitable reduction catalysts, for example, a urea selective reduction catalyst.

Engine 12 can be any hydrocarbon fueled power source, such as an internal combustion engine, in embodiments a diesel engine, a gasoline engine, although not limited to such embodiments.

The reduction catalyst, in embodiments, SCR catalyst 20, can be disposed at various locations, as desired. For example, in one embodiment, SCR catalyst 20 is disposed downstream of the LNT 16. In another embodiment, SCR catalyst 20 is located within the same catalyst brick as the LNT 16. In yet another embodiment, SCR catalyst 20 is used in place of the LNT 16.

A hydrocarbon dosing device 22 is shown upstream of diesel oxidation catalyst 14. The method herein can comprise, for example, delivering a selected dose of hydrocarbon to the oxidation catalyst. Embodiments include disposing fuel, which can be, for example, diesel fuel, ethanol, or gasoline, into the oxidation catalyst to maintain a desired oxygen concentration decrease across the oxidation catalyst 14. Fuel can be disposed into oxidation catalyst 14 by any desired method or device. For example, a hydrocarbon injector can be used to inject diesel fuel, ethanol, or gasoline into the exhaust stream in front of the oxidation catalyst 14. Alternately, the engine can be used to produce hydrocarbons, for example by adding fuel into the engine at some time during or after the combustion cycle so that fuel goes into the exhaust stream. For example, the system can comprise an engine having a combustion system configured to add fuel into the engine during a combustion cycle or after a combustion cycle so that fuel enters the exhaust stream upstream of the oxidation catalyst. In embodiments, a reformer that produces reformate from either gasoline or diesel can be used as a hydrocarbon dosing device to deliver hydrocarbons to the oxidation catalyst. For example, the method herein can comprise delivering a selected dose of hydrocarbon to the oxidation catalyst by using a reformer to produce reformate from either gasoline or diesel fuel and delivering the reformate to the oxidation catalyst.

In one embodiment, change in an oxygen control loop is measured and controlled. Oxygen sensor 24 is disposed downstream of engine 12 providing a signal of engine-out oxygen concentration $O_{2\_EO}$ to processor 26, and oxygen sensor 28 is disposed downstream of diesel oxidation catalyst 14 to provide a signal of DOC oxygen concentration $O_{2\_DOC\_Out}$ to processor 26 to determine the delta oxygen across the DOC to compare with the reference delta oxygen concentration from empirical data 30. In embodiments, processor 26 is a proportional integral derivative controller, although not limited.

In embodiments, additional oxygen sensors can be employed, for example, additional oxygen sensors can be used when a DOC is disposed just upstream of (that is, immediately adjacent to) the DPF and the DPF is located after a urea selective reduction catalyst or LNT or HC-SCR catalyst.

In another embodiment, a second control loop running outside of the oxygen control loop is directed to temperature control. Temperature sensors are disposed at selected locations throughout the system. Temperature 32 is a reference temperature $T_{ref}$. For example, in embodiments temperature sensor 34 is disposed downstream of engine 12. Temperature sensor 36 can be located at any suitable location, for example, in embodiments, temperature sensor 36 can be located in the rear brick of the DOC 14 for sensing the exhaust gas brick temperature, or disposed downstream of the DOC for sensing the temperature of the stream exiting the DOC or at some other desirable location. Temperature sensor 34 provides a signal of engine-out exhaust gas temperature $T_{EO}$ to controller 26 and temperature sensor 36 provides a signal of exhaust gas temperature in the DOC or exiting the diesel oxidation catalyst 14 $T_{DOC\_Rear\_Bed}$ to controller 26. Temperature 38 is the temperature error between the temperature reference 32 and the actual temperature read by temperature sensor 36.

Additional temperature sensors can optionally be employed, for example, upstream of the LNT 16, upstream of the DPF 18, or upstream of the HC-SCR catalyst 20, although not limited to these locations.

Sulfur sensors can be disposed at selected locations to obtain and send one or more signals of sulfur concentration of the various devices to the processor 26. For example, in embodiments, sulfur sensor 40 is disposed upstream of the DOC 14, sulfur sensor 41 is disposed downstream of the DOC 14, sulfur sensor 42 is disposed downstream of the LNT, sulfur sensor 43 is disposed downstream of the SCR catalyst 20, and sulfur sensor 44 is disposed downstream of the DPF 18. In embodiments, the method herein comprises providing a first sulfur sensor upstream of the oxidation catalyst; providing a second sulfur sensor downstream of the oxidation catalyst; providing a third sulfur sensor downstream of the lean NOx trap; providing a fourth sulfur sensor downstream of the reduction catalyst; providing a fifth sulfur sensor downstream of the particulate filter; and sensing one or more signals of sulfur concentration and sending one or more signals of sulfur concentration to the processor 26.

In embodiments, the method herein provides closed loop control of the change in oxygen concentration across the oxidation catalyst 14 to control the temperature of the exhaust stream entering the lean NOx trap 16, particulate filter 18, optional other catalysts, for example, SCR catalyst 20, to control the temperature of these exhaust aftertreatment devices and thereby manage regeneration and desulfation events. Oxygen sensor 24 disposed upstream of the oxidation catalyst 14 and second oxygen sensor 28 disposed downstream of oxidation catalyst 14 provide a measurement of change in oxygen concentration across the oxidation catalyst 14. The response of oxygen sensors 24, 28 is relatively fast and affords high bandwidth for the closed loop control. A decrease in oxygen concentration across the oxidation catalyst 14 is an indication of the heat addition to the exhaust stream entering the aftertreatment regeneration device, for example, lean NOx trap 16, particulate filter 18, SCR catalyst 20, etc., which directly impacts the temperature of those devices. By controlling the oxygen delta across the oxidation catalyst 14, the present system and method achieve improved control of the heat addition to the various exhaust aftertreatment devices resulting in improved temperature control of those devices and improved control of regeneration events.

For particulate filter regeneration, in embodiments, an engine out map of the engine out particulate matter accumulation or a particulate matter (PM) sensor can be used. In one embodiment, a PM sensor 47 can be located after the engine 12 to measure the engine-out PM. Particulate matter sensor 46 can be disposed in the system, such as downstream of the particulate filter 18 or located in the brick of the particulate filter 18 to measure the PM removed from the filter during a DPF regeneration. In embodiments, the method herein includes providing a first particulate matter sensor downstream of the engine and upstream of the particulate filter; providing a second particulate matter sensor downstream of the particulate filter or in the brick of the particulate filter; and sensing an engine out exhaust stream particular matter concentration, sensing an amount of particulate matter removed during a particulate filter regeneration, or a combination thereof; and sending one or more particulate matter signals to the processor.

In addition to particulate filter regeneration, a catalyst disposed upstream or downstream of the particulate filter 18 can be desulfated in a lean air fuel exhaust condition, while a particulate filter regeneration event is occurring. This embodiment enables exhaust temperatures to be held fairly constant to drive sulfur off of a device such as a hydrocarbon-SCR catalyst.

In embodiments, mean oxygen delta can be determined from empirical data while running a transient test to achieve the desired temperature in the oxidation catalyst 14 and particulate filter 18. A low gain adjustment 48 can then be applied to this base value as a function of the temperature error to control the oxidation catalyst 14 bed temperatures. Temperature can be measured in the rear bed, front bed, or both. The temperature of the exhaust gas stream can be measured upstream, downstream, or at some point in the bed (or beds) of the oxidation catalyst 14, or alternatively at some other point downstream of the DOC 14, to determine the temperature error.

Once the oxidation catalyst 14 temperature has been increased to a desired desulfation temperature, the exhaust air fuel ration can be cycled rich and lean to drive off the sulfur from the lean NOx trap 16, SCR catalyst 20, or other exhaust aftertreatment device.

Sulfur content can be determined using a sulfur accumulation model or map or a sulfur sensor can be employed. Sulfur sensor 40 can be disposed upstream of the LNT 16, SCR catalyst 20, or other catalyst and sulfur sensor 42 can be disposed downstream of LNT 16, SCR catalyst 20, or other catalyst, or in the brick of LNT 16, SCR catalyst 20, or other catalyst. In another embodiment, a time-temperature map can be used to determine the amount of sulfur that has been removed from the system.

In alternate embodiments, deactivated SCR catalyst regeneration can be used to regenerate the HC-SCR or Urea-SCR catalyst. For example, during operation of the HC-SCR catalyst, the catalyst may experience deactivation or coking which renders the catalyst inactive. The temperature of the catalyst is taken to a suitable temperature, for example, greater than about 450° C. for a period of time sufficient to drive off any hydrocarbon or coke. Regeneration in this embodiment is not the same as desulfation (or DeSOx). Both HC-SCR and UREA-SCR catalysts can become deactivated from HC deactivation or coking. Regeneration is typically done the in lean operating state, whereas desulfating is accomplished by pulsing the A/F ratio rich and lean to drive off the sulfur.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for regenerating a particulate filter, desulfating a lean NOx trap, desulfating a reduction catalyst, regenerating a reduction catalyst, or a combination thereof, comprising:
providing an oxidation catalyst downstream of an internal combustion engine and upstream of the particulate filter, lean NOx trap, and reduction catalyst;
providing a first oxygen sensor upstream of the oxidation catalyst providing engine-out oxygen concentration;
providing a second oxygen sensor immediately downstream of the oxidation catalyst providing oxygen concentration exiting the oxidation catalyst;
determining a change in oxygen concentration across the oxidation catalyst based on the engine-out oxygen concentration and the oxygen concentration exiting the oxidation catalyst;
providing a temperature control loop including a temperature error function based upon an actual temperature of an exhaust stream exiting the oxidation catalyst and a desired temperature of the exhaust stream exiting the oxidation catalyst;
providing a processor for selecting and maintaining a desired change in oxygen concentration across the oxidation catalyst for a selected period of time to provide the desired temperature of the exhaust stream exiting the oxidation catalyst, wherein the desired change in oxygen concentration is based upon the temperature error function and a mean change in oxygen concentration, and compared with the change in oxygen concentration across the oxidation catalyst to maintain the desired change in oxygen concentration across the oxidation catalyst;
regenerating the particulate filter by passing the exhaust stream exiting the oxidation catalyst through the particulate filter, wherein the temperature of the exhaust stream passing through the particulate filter and the selected period of time are sufficient to regenerate the particulate filter;
desulfating the lean NOx trap by passing the exhaust stream exiting the oxidation catalyst through the lean NOx trap, wherein the temperature of the exhaust stream passing through the lean NOx trap and the selected period of time are sufficient to desulfate the lean NOx trap; and
desulfating or regenerating the reduction catalyst by passing the exhaust stream exiting the oxidation catalyst through the reduction catalyst, wherein the temperature of the exhaust stream passing through the reduction catalyst and the selected period of time are sufficient to desulfate or regenerate the reduction catalyst.

2. The method of claim 1, further comprising
providing a first sulfur sensor upstream of the oxidation catalyst;
providing a second sulfur sensor downstream of the oxidation catalyst;
providing a third sulfur sensor downstream of the lean NOx trap;
providing a fourth sulfur sensor downstream of the reduction catalyst;
providing a fifth sulfur sensor downstream of the particulate filter; and
sensing one or more signals of sulfur concentration and sending one or more signals of sulfur concentration to the processor.

3. The method of claim 1, further comprising:
providing a first particulate matter sensor downstream of the engine and upstream of the particulate filter;
providing a second particulate matter sensor downstream of the particulate filter or in the brick of the particulate filter;
sensing at least one of an engine out exhaust stream particulate matter concentration and an amount of particulate matter removed during a particulate filter regeneration; and
sending one or more particulate matter signals to the processor.

4. The method of claim 1, wherein the particulate filter is a gasoline particulate filter or a diesel particulate filter.

5. The method of claim 1, wherein the engine is a diesel engine or a gasoline engine.

6. The method of claim 1, wherein the reduction catalyst is a hydrocarbon selective reduction catalyst.

7. The method of claim 1, wherein the reduction catalyst is a urea selective reduction catalyst.

8. The method of claim 1, further comprising delivering a selected dose of hydrocarbon to the oxidation catalyst.

9. The method of claim 1, further comprising delivering a selected dose of hydrocarbon to the oxidation catalyst using a hydrocarbon injector to inject diesel fuel into the exhaust stream in front of the oxidation catalyst.

10. The method of claim 1, further comprising delivering a selected dose of hydrocarbon to the oxidation catalyst by adding fuel into the engine during a combustion cycle or after a combustion cycle so that fuel enters the exhaust stream upstream of the oxidation catalyst.

11. The method of claim 1, further comprising delivering a selected dose of hydrocarbon to the oxidation catalyst by using a reformer to produce reformate from either gasoline or diesel and delivering the reformate to the oxidation catalyst.

12. The method of claim 1, further comprising:
regenerating the reduction catalyst by deactivated catalyst regeneration; and
wherein the reduction catalyst is a hydrocarbon-selective reduction catalyst or a urea-selective reduction catalyst.

13. A system for regenerating a particulate filter, desulfating a lean NOx trap, desulfating a selective catalytic reduction catalyst, regenerating a selective catalytic reduction catalyst, or a combination thereof, comprising:
an oxidation catalyst disposed downstream of an internal combustion engine;
a particulate filter disposed downstream of the oxidation catalyst;
a lean NOx trap disposed upstream or downstream of the particulate filter;
a first oxygen sensor disposed upstream of the oxidation catalyst providing engine-out oxygen concentration;
a second oxygen sensor disposed downstream of the oxygen catalyst providing oxygen concentration exiting the oxidation catalyst;
an oxygen control loop determining a change in oxygen concentration across the oxidation catalyst based on the engine-out oxygen concentration and the oxygen concentration exiting the oxidation catalyst;
a temperature control loop including a temperature error function based upon an actual temperature of an exhaust stream exiting the oxidation catalyst and a desired temperature of the exhaust stream exiting the oxidation catalyst;
a processor for selecting and maintaining a desired change in oxygen concentration across the oxidation catalyst for a selected period of time to provide the desired temperature to the exhaust stream exiting the oxidation catalyst, the desired change in oxygen concentration being based upon the temperature error function and a mean change in oxygen concentration, and compared with the change in oxygen concentration across the oxidation catalyst to maintain the desired change in oxygen concentration;
wherein the selected period of time and desired temperature are sufficient to regenerate the particulate filter by passing the exhaust stream exiting the oxidation catalyst through the particulate filter;
wherein the selected period of time and desired temperature are sufficient to desulfate the lean NOx trap by passing the exhaust stream exiting the oxidation catalyst through the lean NOx trap; and
wherein the selected period of time and desired temperature are sufficient to desulfate the reduction catalyst by passing the exhaust stream exiting the oxidation catalyst through the reduction catalyst.

14. The system of claim 13, further comprising:
a first sulfur sensor upstream of the oxidation catalyst;
a second sulfur sensor downstream of the oxidation catalyst;
a third sulfur sensor downstream of the lean NOx trap;
a fourth sulfur sensor downstream of the reduction catalyst;
a fifth sulfur sensor downstream of the particulate filter;
for obtaining and sending one or more signals of sulfur concentration to the processor.

15. The system of claim 13, further comprising:
a first particulate matter sensor downstream of the engine and upstream of the particulate filter;
a second particulate matter sensor downstream of the particulate filter or in the brick of the particulate filter;
for measuring at least one of engine out particulate matter and particulate filter particulate matter removed during a particulate filter regeneration.

16. The system of claim 13, wherein the particulate filter is a diesel particulate filter or a gasoline particulate filter.

17. The system of claim 13, wherein the engine is a diesel engine or a gasoline engine.

18. The system of claim 13, wherein the reduction catalyst is a hydrocarbon selective reduction catalyst.

19. The system of claim 13, wherein the reduction catalyst is a urea selective reduction catalyst.

20. The system of claim 13, further comprising a hydrocarbon dosing device for delivering a selected dose of hydrocarbon to the oxidation catalyst.

21. The system of claim 13, further comprising a hydrocarbon injector to inject diesel fuel or gasoline into the exhaust stream in front of the oxidation catalyst.

22. The system of claim 13, further comprising an engine having a combustion system configured to add fuel into the engine during a combustion cycle or after a combustion cycle so that fuel enters the exhaust stream upstream of the oxidation catalyst.

23. The system of claim 13, further comprising a reformer to produce reformate from either gasoline or diesel fuel for delivering the reformate to the oxidation catalyst.

* * * * *